UNITED STATES PATENT OFFICE.

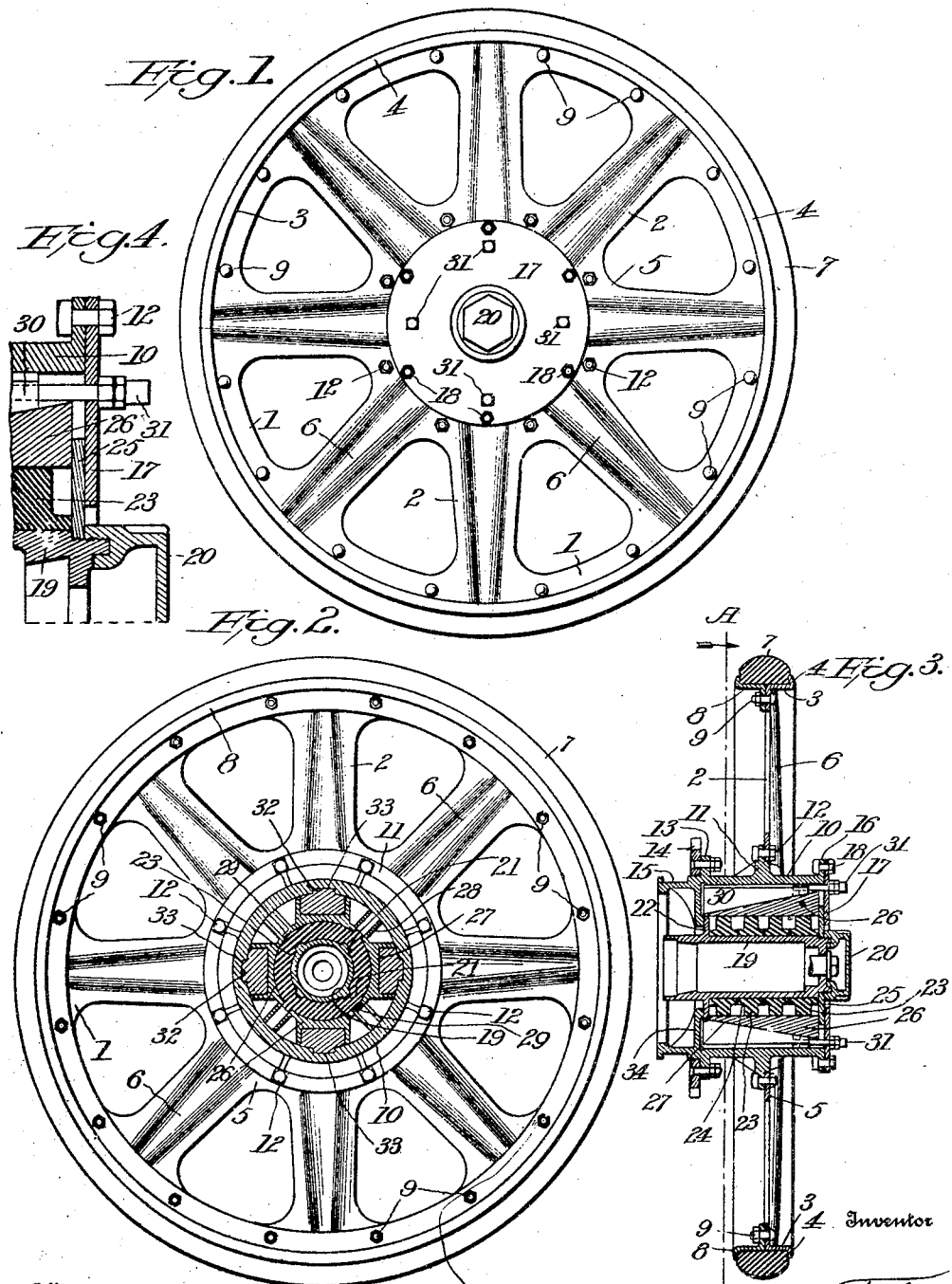

CHARLES THOMAS SCHOEN, OF MOYLAN, PENNSYLVANIA.

VEHICLE-WHEEL.

No. 831,384.  Specification of Letters Patent.  Patented Sept. 18, 1906.

Application filed October 30, 1905. Serial No. 285,000.

*To all whom it may concern:*

Be it known that I, CHARLES THOMAS SCHOEN, a citizen of the United States, residing at Moylan, in the county of Delaware and State of Pennsylvania, have invented a certain new and useful Improvement in Vehicle-Wheels, of which the following is a full, clear, and exact description.

The object of this invention is to provide a wheel designed to take the place and perform the functions of a wheel having a pneumatic tire and which will be free from the objections pertaining to pneumatic tires and, further, which may be manufactured at less first cost and repaired readily and economically.

While the invention is herein shown and described as embodied in a wheel designed for a motor-vehicle, it is to be understood, of course, that it is applicable to any vehicle-wheel where a rubber tire, and, in fact, any other tire, is to be used.

The invention comprises, essentially, in its preferred form a disk of steel formed to represent spokes and adapted to receive a rubber or other tire and having a hub composed of an axle-receiving sleeve or axle-box and on which a series of compression-springs, preferably rings of rubber, are mounted and confined against longitudinal movement, the disk having applied to it a sleeve, between which and the springs tension devices are applied, so that the load is transmitted by the disk to the springs and all shocks are taken up by the springs substantially as I will proceed now more particularly to set forth and finally claim.

Before proceeding to a description of the details of construction it is to be observed that prior to this invention so-called "spring-wheels" have been designed in which the tire-bearing part of the wheel has had a radial movement with relation to that portion of the wheel or hub immediately receiving the axle and springs of various sorts have been interposed between these portions—namely, the hub portion and the tire-bearing portion—in various ways by which shock has been taken up.
In the accompanying drawings, illustrating the invention, in the several figures of which like parts are similarly designated, Figure 1 is a front elevation. Fig. 2 is a section taken substantially in the plane of line A B of Fig. 3 and looking to the right. Fig. 3 is a transverse vertical section. Fig. 4 is a detail vertical section of a portion of the "hub," so called, on a larger scale.

The wheel comprises a disk 1, preferably of steel, cut out to form the spokes 2, the tire-receiving-rim 3, having the tire-engaging flange 4, and the central annular web 5. The spokes are embossed longitudinally, as at 6, in order to strengthen them. The tire 7 may be of solid rubber or of any other material and may be fastened to the rim of the disk by means of a flanged annulus 8, which is bolted to the disk by bolts 9 or by other means. The ring-shaped web 5 is connected to a sleeve 10 by means of a flange 11 on said sleeve and bolts 12. This sleeve extends laterally on both sides of the disk after the manner of a hub, and, as herein shown, it is provided with a flange 13, to which may be bolted the sprocket-wheel 14 when the wheel is used as a driving-wheel, and, further, it may be provided with the friction-brake surface 15. The outer end of the sleeve 10 is provided with a flange 16 to receive the face-plate 17, which is secured thereto by bolts 18.

A central sleeve 19 is provided to receive the axle, a portion only of which is shown in Fig. 3, and this sleeve 19 is, in fact, an axle-box and is so referred to herein. This sleeve is interiorly finished in any suitable way—as, for example, to receive roller-bearings or other antifriction-bearings (not shown) used in connection with the axle—and it is provided with a screw-cap 20. As shown in Fig. 2, the sleeve 19 is provided exteriorly with longitudinal ribs 21, and near its rear end it is provided with a vertically-arranged flange 22. Upon this sleeve is mounted a series of compression-springs 23, preferably made as rubber rings, with base-flanges 24 projecting laterally on both sides a sufficient distance to space the rings apart and allow them lateral spread when under compression without interfering with one another. These rings are restrained from longitudinal movement rearwardly by means of the flange 22, and they are restrained from longitudinal movement outwardly and forwardly by means of a ring 25, screwed onto the sleeve 19 or otherwise removably applied thereto.

Between the springs and the sleeve 10 a space is left in which a number—say four— of segmental blocks 26 are placed, and these segmental blocks, as shown more in detail in Fig. 2, have the longitudinal inclined recesses 27 and the side flanges 28, and between these flanges 28 of adjacent blocks extend transverse ribs 29 on the springs, so that when the parts are assembled engagement of the ribs 21 on the sleeve 19 with complemental recesses in the rubber rings, as shown in Fig. 2, and the engagement of the ribs 29 on the springs with the adjacent side flanges 28 on the blocks will suffice to prevent any rotary creeping motion of the rings on the sleeve 19.

Within the inclined recesses 27 of the blocks 26 are arranged tension-wedges 30, and these tension-wedges are provided with adjusting screws and nuts 31, supported in the face-plate 17.

The backs of the tension-wedges are provided with longitudinal ribs 32, which enter corresponding grooves 33 in the sleeve 10, and these elements combine not only to guide the blocks 30 in their adjustment, but they also serve to keep the blocks from creeping rotarily.

The face-plate 17 overlaps the ring 25, and thus prevents displacement of the wheel rearwardly, and the sleeve 10 is made with an interior vertical flange 34, which coöperates with the vertical flange 22 on the sleeve or axle-box 19 to prevent displacement in the opposite direction.

Obviously the load will be transmitted through the disk to the devices 30 and 26 and thence to the springs 23, and the shocks ordinarily taken up by the pneumatic tire will be taken up by these springs.

While I prefer to use the tension devices composed of the boxes 26 and 30, I do not limit the invention to their use, and while I prefer also to use a pressed-steel tire-receiving member, such as described, in connection with the axle-box member it is obvious that this may be replaced by a tire-receiving member of other construction.

It is obvious that the parts are readily accessible and every provision has been made for ready repair.

By the construction described a relatively light and very strong and stiff wheel is produced and one whose percentage of useful elasticity is approximately, if not quite, equal to the pneumatic-tire wheel, and, moreover, the wheel of the present invention is free from danger of puncture and collapse and may be used on roads of any character, however rough.

What I claim is—

1. A vehicle-wheel, comprising essentially a steel disk having a tire-receiving rim and a central annular web, a sleeve secured to said web and extending laterally on both sides of the disk, an axle-box arranged within the sleeve, compression-springs applied externally to said axle-box, and means for connecting the sleeve and axle-box and for positioning and retaining the axle-box and springs within the sleeve.

2. A vehicle-wheel, comprising essentially a steel disk having embossed spokes, a tire-receiving medium and a central annular web, a sleeve fixed to said web and having a rear flange, an axle-box arranged in said sleeve, compression-springs applied externally to the axle-box and held from escape rearwardly by the rear flange, a face-plate and means to connect the face-plate to the sleeve and axle-box and restrain the springs from escape forwardly.

3. In a vehicle-wheel, an axle-box, a series of annular rubber springs mounted directly thereon, a tire-receiving member having a sleeve of larger diameter than the rubber rings, adjusting means interposed between the rubber rings and said sleeve, and means to inclose the said adjusting means and the rings and connect the sleeve and axle-box.

4. In a vehicle-wheel, an axle-box, a series of annular rubber springs mounted thereon, means to confine them in place, an encircling sleeve, and tension devices interposed between the sleeve and springs.

5. A vehicle-wheel, comprising a metal disk, having integral embossed spokes, a tire-receiving rim and an internal hub-attaching ring-shaped web, a rubber tire arranged in said rim, and a sleeve attached to said web and projecting laterally from both sides thereof, an axle-box, a series of annular rubber springs arranged on said box, adjustable tension devices interposed between the springs and the sleeve, and means to inclose the said springs and adjusting devices.

6. In a vehicle-wheel, an axle-box having a vertical flange at its rear, a series of annular rubber springs mounted upon said axle-box, a face-plate for confining said springs on said box, a tire-receiving member provided with a sleeve encircling said springs, and means to connect the sleeve and the axle-box.

7. In a vehicle-wheel, an axle-box having a vertical flange at its rear, a series of annular rubber springs mounted upon said axle-box, a ring screwed on the axle-box to confine the springs between itself and the rear flange, a tire-receiving member provided with a sleeve encircling the said springs and axle-box and engaging the axle-box at the rear, and a face-plate attached to the sleeve and overlapping the ring.

8. In a vehicle-wheel, an axle-box having a vertical flange at its rear, a series of annular rubber springs mounted upon said axle-box, a ring screwed on the axle-box to confine the springs between itself and the rear flange, a tire-receiving member provided with a sleeve encircling the said springs and axle-box and having a vertical flange coacting with the flange on the axle-box at the rear or inner side of the wheel, and means to close the front.

In testimony whereof I have hereunto set my hand this 28th day of October, A. D. 1905.

CHARLES THOMAS SCHOEN.

Witnesses:
  WM. L. ACHILLES,
  L. GRANT J. SNYDER.